US012739209B2

(12) United States Patent
Zhao et al.

(10) Patent No.: US 12,739,209 B2
(45) Date of Patent: Sep. 15, 2026

(54) DATA UNIT PROCESSING METHOD AND APPARATUS, AND COMMUNICATION DEVICE

(71) Applicant: DATANG MOBILE COMMUNICATIONS EQUIPMENT CO., LTD., Beijing (CN)

(72) Inventors: Yali Zhao, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 82 days.

(21) Appl. No.: 18/862,504

(22) PCT Filed: Mar. 30, 2023

(86) PCT No.: PCT/CN2023/085121
§ 371 (c)(1),
(2) Date: Nov. 1, 2024

(87) PCT Pub. No.: WO2023/231550
PCT Pub. Date: Dec. 7, 2023

(65) Prior Publication Data

US 2025/0286825 A1 Sep. 11, 2025

(30) Foreign Application Priority Data

May 31, 2022 (CN) ........................ 202210610524.7

(51) Int. Cl.
*H04L 47/32* (2022.01)
*H04L 69/321* (2022.01)

(52) U.S. Cl.
CPC ............ *H04L 47/32* (2013.01); *H04L 69/321* (2013.01)

(58) Field of Classification Search
CPC .............................. H04L 47/32; H04L 69/321
(Continued)

(56) References Cited

U.S. PATENT DOCUMENTS 12,363,047 B2 * 7/2025 Chen .................... H04L 69/324
2007/0229214 A1 * 10/2007 Meirick ................. H04L 49/55 340/2.23

(Continued)

FOREIGN PATENT DOCUMENTS

CN 113923712 A 1/2022
CN 113923713 A 1/2022

(Continued)

OTHER PUBLICATIONS

TR23, "Technical Specification Group Services and System Aspects," 3GPP TR 23.700-60 V0.2.0, 3rd Generation Partnership Project, Apr. 2022 (Apr. 22, 2022) (Year: 2022).*

(Continued)

*Primary Examiner* — Ruolei Zong
(74) *Attorney, Agent, or Firm* — Ladas & Parry, LLP

(57) ABSTRACT

The present disclosure provides a data unit processing method and apparatus, and a communication device. The method comprises: a target air-interface protocol layer of a communication device determines an association relationship between service data units (SDUs) according to first indication information; among multiple SDUs with the association relationship, if there is at least one SDU that needs to be discarded or is not successfully transmitted, then the multiple SDUs with the association relationship and/or protocol data units (PDUs) corresponding to the multiple SDUs with the association relationship are discarded.

18 Claims, 2 Drawing Sheets

The target air-interface protocol layer of a communication device determines an association relationship between service data units (SDUs) according to first indication information — 101

↓

In case that at least one SDU among the multiple SDUs with the association relationship needs to be discarded or is not successfully transmitted, the multiple SDUs with the association relationship and/or protocol data units (PDUs) corresponding to the multiple SDUs with the association relationship are discarded — 102

(58) Field of Classification Search
USPC .......................................................... 709/238
See application file for complete search history.

(56) References Cited

U.S. PATENT DOCUMENTS

2010/0135202 A1* 6/2010 Chun ...................... H04L 47/10 370/328
2018/0219789 A1* 8/2018 Chaudhuri .............. H04L 47/31
2020/0068652 A1* 2/2020 Xu ........................ H04L 1/1642
2023/0246750 A1* 8/2023 Kanamarlapudi ........ H04L 1/08 714/726
2024/0380705 A1* 11/2024 Jo ........................... H04L 47/32
2025/0024320 A1* 1/2025 Höhne .................. H04W 28/04
2025/0119785 A1* 4/2025 Rao ................... H04W 28/0236

FOREIGN PATENT DOCUMENTS

WO WO-2009038365 A2 * 3/2009 ............ H04W 28/14
WO WO-2022075912 A1 * 4/2022 ........... H04L 47/283
WO WO-2023005909 A1 * 2/2023 ............ H04W 28/02

OTHER PUBLICATIONS

"Technical Specification Group Services and System Aspects," 3GPP TR 23.700-60 V0.2.0, 3rd Generation Partnership Project, Apr. 2022 (Apr. 22, 2022).
Extended European Search Report from EP patent application No. 23814746.6, mailed Apr. 22, 2025.
Written Opinion and International Search Report in International Application No. PCT/CN2023/085121, mailed on Jul. 10, 2023, with English translation provided by WIPO.

* cited by examiner

410
Processor
420
Memory
Bus interface
400
Transceiver

DATA UNIT PROCESSING METHOD AND APPARATUS, AND COMMUNICATION DEVICE

CROSS-REFERENCE TO RELATED APPLICATIONS

The present application is a U.S. national phase application of a PCT Application No. PCT/CN2023/085121 filed on Mar. 30, 2023, which claims a priority to the Chinese patent application No. 202210610524.7 filed in China on May 31, 2022, the disclosures of which are incorporated herein by reference in their entireties.

TECHNICAL FIELD

The present disclosure relates to the field of communication technology, and in particular to a data unit processing method and apparatus, and a communication device.

BACKGROUND eXtended Reality (XR) and Cloud Game (CG) are among the most important 5G media applications. XR refers to all environments and human-computer interactions combining reality and virtuality that are generated by computer technologies and devices. XR includes: Augmented Reality (AR), Mixed Reality (MR), Virtual Reality (VR), etc.

XR services are modeled based on data frames. One frame can be further divided into slices or tiles or sub-pictures. The same frame, slice, tile or sub-picture can be divided into one or more packet data units (which is also called PDU set in the 3GPP protocol). The upper layer sends the packet data unit to the 5G user plane air-interface protocol layer, and the 5G user plane air-interface protocol layer processes the data.

In the related art, the processing performed by the 5G user plane air-interface protocol layer on service data unit (SDU) is to determine, for each individual SDU, whether the SDU needs to be discarded. For XR services, the packet data units sent by the upper layer are not completely independent of each other. There may be a certain correlation between different packet data units. The data unit processing method in the related art may lead to unnecessary data transmission over the air interface, resulting in reduced transmission efficiency.

SUMMARY

The present disclosure is to provide a data unit processing method and apparatus and a communication device, which solves the problem that the data unit processing method in the related art leads to reduced transmission efficiency over the air interface.

An embodiment of the present disclosure provides a data unit processing method, including:

determining, by a target air-interface protocol layer of a communication device, an association relationship between service data units (SDUs) according to first indication information;

in case that at least one SDU among the multiple SDUs with the association relationship needs to be discarded or is not successfully transmitted, discarding the multiple SDUs with the association relationship and/or protocol data units (PDUs) corresponding to the multiple SDUs with the association relationship.

Optionally, the target air-interface protocol layer includes one of the following:

a packet data convergence protocol (PDCP) layer;

a radio link control (RLC) layer;

a medium access control (MAC) layer.

Optionally, the first indication information includes at least one of the following:

frame indication information;

sub-picture indication information;

slice indication information;

tile indication information;

packet data unit set indication information; or a QoS parameter corresponding to a packet data unit set.

Optionally, the method further includes:

obtaining the first indication information;

wherein the first indication information is carried in one of the following information:

an SDU header;

an SDU payload;

inter-layer interaction information sent by an upper layer to an access stratum.

Optionally, the method further includes:

determining whether an SDU discard processing function is activated or deactivated according to configuration information;

in case that at least one SDU among the multiple SDUs with the association relationship needs to be discarded or is not successfully transmitted, the discarding the multiple SDUs with the association relationship and/or PDUs corresponding to the multiple SDUs with the association relationship includes:

in case that the SDU discard processing function is activated and the at least one SDU among the multiple SDUs with the association relationship needs to be discarded or is not successfully transmitted, discarding the multiple SDUs with the association relationship and/or PDUs corresponding to the multiple SDUs with the association relationship.

Optionally, the configuration information is configured for one of the following:

a bearer;

a logical channel;

a packet data unit set.

Optionally, in case that the at least one SDU among the multiple SDUs with the association relationship needs to be discarded or is not successfully transmitted, the discarding the multiple SDUs with the association relationship and/or PDUs corresponding to the multiple SDUs with the association relationship includes one of the following:

in case that a timer corresponding to any one of the multiple SDUs with the association relationship expires, discarding the multiple SDUs with the association relationship and/or PDUs corresponding to the multiple SDUs with the association relationship; wherein one timer is maintained for each of the multiple SDUs with the association relationship;

in case that a timer corresponding to any one of the multiple SDUs with the association relationship expires, discarding the multiple SDUs with the association relationship and/or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding the multiple SDUs with the association relationship and/or PDUs corresponding to the multiple SDUs with the association relationship, wherein one timer is maintained for the multiple SDUs with the association relationship;

in case that it is determined, according to congestion indication information sent by a lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting the multiple SDUs with the association relationship and/or PDUs corresponding to the multiple SDUs with the association relationship at the target air-interface protocol layer;

for protocol layer entity reestablishment in the target air-interface protocol layer, for a data radio bearer (DRB) in an un-acknowledged mode, in case that the protocol layer entity is a receiving entity, SDUs stored in the protocol layer entity include multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for a DRB in the un-acknowledged mode and/or a DRB in an acknowledged mode, in case that SDUs stored in the protocol layer entity include multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

in case that the multiple SDUs with the association relationship belong to one packet data unit set, and one or more SDUs among the multiple SDUs with the association relationship have not been successfully sent when an absolute time at which the packet data unit set is to be sent is reached, discarding the multiple SDUs with the association relationship and/or PDUs corresponding to the multiple SDUs with the association relationship.

Optionally, the method further includes:

in case that one timer is maintained for the multiple SDUs with the association relationship, upon a first SDU among the multiple SDUs with the association relationship being received, starting the timer.

Optionally, the multiple SDUs with the association relationship each belong to a different protocol layer entity of the target air-interface protocol layer; or, at least some of the multiple SDUs with the association relationship belong to a same protocol layer entity of the target air-interface protocol layer.

Optionally in case that the multiple SDUs with the association relationship each belong to the different protocol layer entity of the target air-interface protocol layer, the different protocol layer entities exchange second indication information with each other;

wherein the second indication information includes at least one of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

Optionally, the frame indication information includes at least one of the following:

frame type indication information; or frame index indication information.

Optionally, the sub-picture indication information includes an index of the sub-picture; or, the slice indication information includes an index of the slice; or, the tile indication information includes an index of the tile; or, the QoS parameter corresponding to the packet data unit set includes at least a packet data unit set integrated handling indication (PSIHI).

Optionally, the packet data unit set indication information includes at least one of the following:

an index of the packet data unit set;

information of a window corresponding to the packet data unit set;

a starting position and a duration of the packet data unit set;

a starting position and an ending position of the packet data unit set; or an absolute time at which the packet data unit set is to be sent.

An embodiment of the present disclosure provides a communication device, including: a memory, a transceiver, and a processor;

wherein the memory is configured to store a computer program; the transceiver is configured to transmit and receive data under the control of the processor; and the processor is configured to read the computer program in the memory and perform the following operations:

determining, by a target air-interface protocol layer, an association relationship between service data units (SDUs) according to first indication information;

in case that at least one SDU among the multiple SDUs with the association relationship needs to be discarded or is not successfully transmitted, discarding the multiple SDUs with the association relationship and/or protocol data units (PDUs) corresponding to the multiple SDUs with the association relationship.

Optionally, the target air-interface protocol layer includes one of the following:

a PDCP layer;

an RLC layer;

an MAC layer.

Optionally, the first indication information includes at least one of the following:

frame indication information;

sub-picture indication information;

slice indication information;

tile indication information;

a QoS parameter corresponding to a packet data unit set.

Optionally, the processor is configured to read the computer program in the memory and perform the following operations:

obtaining the first indication information;

wherein the first indication information is carried in one of the following information:

an SDU header;

an SDU payload;

inter-layer interaction information sent by an upper layer to an access stratum.

Optionally, the processor is configured to read the computer program in the memory and perform the following operations:

determining whether an SDU discard processing function is activated or deactivated according to configuration information;

in case that the SDU discard processing function is activated and the at least one SDU among the multiple SDUs with the association relationship needs to be discarded or is not successfully transmitted, discarding the multiple SDUs with the association relationship and/or PDUs corresponding to the multiple SDUs with the association relationship.

Optionally, the configuration information is configured for one of the following:

a bearer;

a logical channel;

a packet data unit set.

Optionally, the processor is configured to read the computer program in the memory and perform one of the following operations:

in case that a timer corresponding to any one of the multiple SDUs with the association relationship expires, discarding the multiple SDUs with the association relationship and/or PDUs corresponding to the multiple SDUs with the association relationship; wherein one timer is maintained for each of the multiple SDUs with the association relationship;

in case that a timer corresponding to any one of the multiple SDUs with the association relationship expires, discarding the multiple SDUs with the association relationship and/or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding the multiple SDUs with the association relationship and/or PDUs corresponding to the multiple SDUs with the association relationship, wherein one timer is maintained for the multiple SDUs with the association relationship;

in case that it is determined, according to congestion indication information sent by a lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting the multiple SDUs with the association relationship and/or PDUs corresponding to the multiple SDUs with the association relationship at the target air-interface protocol layer;

for protocol layer entity reestablishment in the target air-interface protocol layer, if the protocol layer entity is a receiving entity, for a data radio bearer DRB in an un-acknowledged mode, when the SDU stored in the protocol layer entity includes a plurality of SDUs with an association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for a DRB in the un-acknowledged mode and/or a DRB in an acknowledged mode, when the SDU stored in the protocol layer entity includes multiple SDUs with an association relationship, and at least one of the multiple SDUs with the association relationship is not successfully received, discarding the multiple SDUs with the association relationship and not delivering the multiple SDUs with the association relationship to the upper layer of the target air-interface protocol layer;

in case that the multiple SDUs with the association relationship belong to one packet data unit set, and one or more SDUs among the multiple SDUs with the association relationship have not been successfully sent when an absolute time at which the packet data unit set is to be sent is reached, discarding the multiple SDUs with the association relationship and/or PDUs corresponding to the multiple SDUs with the association relationship.

Optionally, the processor is configured to read the computer program in the memory and perform the following operations:

in case that one timer is maintained for the multiple SDUs with the association relationship, upon a first SDU among the multiple SDUs with the association relationship being received, starting the timer.

Optionally, the multiple SDUs with the association relationship each belong to a different protocol layer entity of the target air-interface protocol layer; or, at least some of the multiple SDUs with the association relationship belong to a same protocol layer entity of the target air-interface protocol layer.

Optionally, in case that the multiple SDUs with the association relationship each belong to the different protocol layer entity of the target air-interface protocol layer, the different protocol layer entities exchange second indication information with each other;

wherein the second indication information includes at least one of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

Optionally, the frame indication information includes at least one of the following:

frame type indication information; or frame index indication information.

Optionally, the sub-picture indication information includes an index of the sub-picture; or, the slice indication information includes an index of the slice; or, the tile indication information includes an index of the tile; or, the QoS parameter corresponding to the packet data unit set includes at least a packet data unit set integrated handling indication (PSIHI).

Optionally, the packet data unit set indication information includes at least one of the following:

- an index of the packet data unit set;
- information of a window corresponding to the packet data unit set;
- a starting position and a duration of the packet data unit set;
- a starting position and an ending position of the packet data unit set;
- an absolute time at which the packet data unit set is to be sent.

An embodiment of the present disclosure provides a data unit processing apparatus, including:

- a first determining unit, configured for a target air-interface protocol layer to determine an association relationship between service data units (SDUs) according to the first indication information;
- a first processing unit, configured to in case that at least one SDU among the multiple SDUs with the association relationship needs to be discarded or is not successfully transmitted, discard the multiple SDUs with the association relationship and/or protocol data units (PDUs) corresponding to the multiple SDUs with the association relationship.

An embodiment of the present disclosure provides a processor-readable storage medium on which a computer program is stored. When the computer program is executed by a processor, the steps of the above-mentioned data unit processing method are implemented.

The foregoing technical solution of the present disclosure has the following beneficial effects.

In embodiments of the present disclosure, the target air-interface protocol layer of the communication device determines the association relationship between SDUs based on the first indication information, and when at least one SDU among multiple SDUs with an association relationship needs to be discarded or is not successfully transmitted, the multiple SDUs with the association relationship and/or PDUs corresponding to the multiple SDUs with the association relationship are all discarded, so as to avoid unnecessary data transmission over the air interface, thereby improving transmission efficiency and improving system resource utilization.

DETAILED DESCRIPTION

In order to make the technical problems, technical solutions and advantages to be solved by the present disclosure clearer, the following will be described in detail in conjunction with the accompanying drawings and specific embodiments. In the following description, specific details such as specific configurations and components are provided only to help fully understand the embodiments of the present disclosure. Therefore, it should be clear to those skilled in the art that various changes and modifications can be made to the embodiments described herein without departing from the scope and spirit of the present disclosure. In addition, for clarity and conciseness, the description of known functions and structures is omitted.

It should be understood that the references to "one embodiment" or "an embodiment" throughout the specification mean that the specific features, structures, or characteristics associated with the embodiment are included in at least one embodiment of the present disclosure. Therefore, the references to "in one embodiment" or "in an embodiment" throughout the specification do not necessarily refer to the same embodiment. In addition, these specific features, structures, or characteristics may be combined in any suitable manner in one or more embodiments.

In various embodiments of the present disclosure, it should be understood that the size of the serial numbers of the following processes does not mean the order of execution. The execution order of each process should be determined by its function and internal logic, and should not constitute any limitation on the implementation process of the embodiments of the present disclosure.

In the embodiments of the present disclosure, the term "and/or" describes the association relationship of associated objects, indicating that three relationships may exist. For example, A and/or B may represent: A exists alone, A and B exist at the same time, and B exists alone. The character "/" generally indicates that the associated objects are in an "or" relationship.

In the embodiments of the present disclosure, the term "multiple" refers to two or more than two, and other quantifiers are similar thereto.

The technical solutions in the embodiments of the present disclosure will be described clearly and completely hereinafter with reference to the drawings in the embodiments of the present disclosure. Obviously, the described embodiments are only part of the embodiments of the present disclosure, not all of the embodiments. Based on the embodiments in the present disclosure, all other embodiments obtained by ordinary technicians in this field without making creative work are within the scope of the present disclosure.

Specifically, an embodiment of the present disclosure provides a data unit processing method, which solves the problem that the data unit processing method in the related art leads to reduced transmission efficiency over the air interface.

Figure 1:
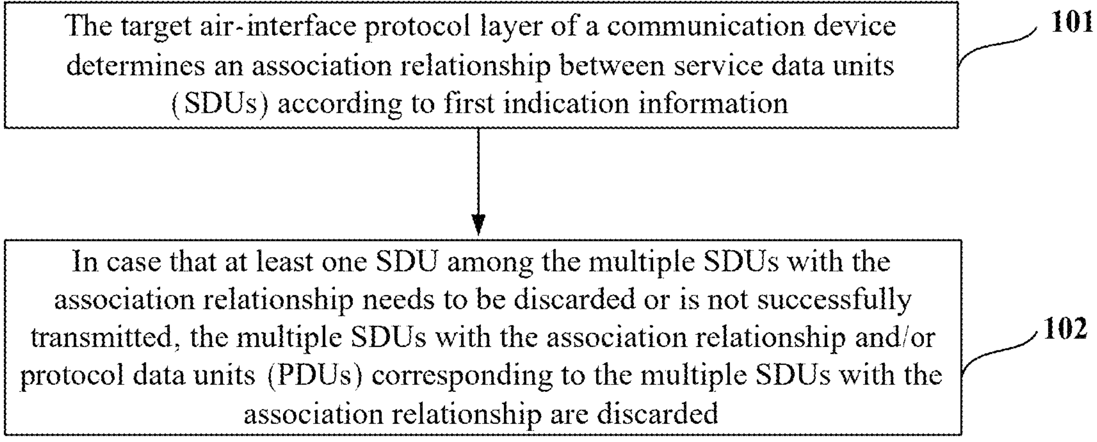
FIG. 1 is a flow chart of a data unit processing method according to an embodiment of the present disclosure.

As shown in FIG. 1, an embodiment of the present disclosure provides a data unit processing method, which specifically includes the following steps 101 and 102.

Step 101: The target air-interface protocol layer of a communication device determines an association relationship between service data units (SDUs) according to first indication information.

The communication device can be a terminal or a network side device, such as a base station, a distributed unit, or a central unit. The target air-interface protocol layer is, for example, a 5G user plane air-interface protocol layer. The first indication information is used for indicating the association relationship between multiple SDUs. Optionally, the first indication information can directly indicate the association relationship between multiple SDUs in an explicit manner (for example, indicating that SDUs with the same frame index have an association relationship). The first indication information can also indicate the association relationship between multiple SDUs in an implicit manner (for example, indicating that SDUs corresponding to PDUs in the same set of PDUs have an association relationship). The target air-interface protocol layer can determine the association relationship between multiple SDUs based on the first indication information.

Step 102: In case that at least one SDU among the multiple SDUs with the association relationship needs to be discarded or is not successfully transmitted, the multiple SDUs with the association relationship and/or protocol data units (PDUs) corresponding to the multiple SDUs with the association relationship are discarded.

The multiple SDUs may refer to two or more SDUs. After the target air-interface protocol layer determines that there is an association relationship between the multiple SDUs, if at least one SDU in the multiple SDUs with the association relationship needs to be discarded or is not successfully transmitted, then the target air-interface protocol layer needs to discard all SDUs with the association relationship, and/or discard all PDUs corresponding to the multiple SDUs with the association relationship. In a possible implementation, the SDU needs to be discarded, for example: some SDUs need to be discarded when the protocol layer is congested, and an SDU need to be discarded when the SDU is invalid (expires).

When an upper layer (such as the core network) sends a data frame, it can send the SDU or split the SDU into PDUs for sending. Therefore, when the target air-interface protocol layer discards the SDU, it may discard the multiple SDUs with the association relationship, or it may discard the PDUs corresponding to the SDUs with the association relationship.

In the embodiments of the present disclosure, the target air-interface protocol layer of the communication device determines the association relationship between SDUs based on the first indication information, and when at least one SDU among multiple SDUs with an association relationship needs to be discarded or is not successfully transmitted, the multiple SDUs with an association relationship and/or the PDUs corresponding to the multiple SDUs are discarded, so as to avoid unnecessary data transmission over the air interface, thereby improving transmission efficiency and improving system resource utilization.

Optionally, the target air-interface protocol layer includes one of the following:

a PDCP layer;

an RLC layer;

an MAC layer.

In this embodiment, the target air-interface protocol layer may include but is not limited to any one of a PDCP layer, an RLC layer, and an MAC layer.

Optionally, the first indication information includes at least one of the following.

(1) Frame Indication Information

Optionally, the frame indication information includes at least one of the following:

frame type indication information; or frame index indication information.

In this embodiment, the association relationship between multiple SDUs can be indicated by the frame type indication information and/or frame index indication information. In a possible implementation: the first indication information includes a frame index, and SDUs with the same frame index are SDUs with an association relationship; and/or, the first indication information includes a frame type, and SDUs of the same frame type that correspond to the packet data unit are SDUs with an association relationship.

(2) Sub-Picture Indication Information

Optionally, the sub-picture indication information includes an index of the sub-picture. In a possible implementation: the first indication information includes the index of the sub-picture, and SDUs with the same sub-picture index are SDUs with an association relationship.

(3) Slice Indication Information

Optionally, the slice indication information includes an index of the slice. In a possible implementation: the first indication information includes the slice index, and SDUs with exactly the same slice index are SDUs with an association relationship.

(4) Tile Indication Information

Optionally, the tile indication information includes an index of the tile. In a possible implementation: the first indication information includes the tile index, and SDUs with the same tile index are SDUs with an association relationship.

Figure 2:
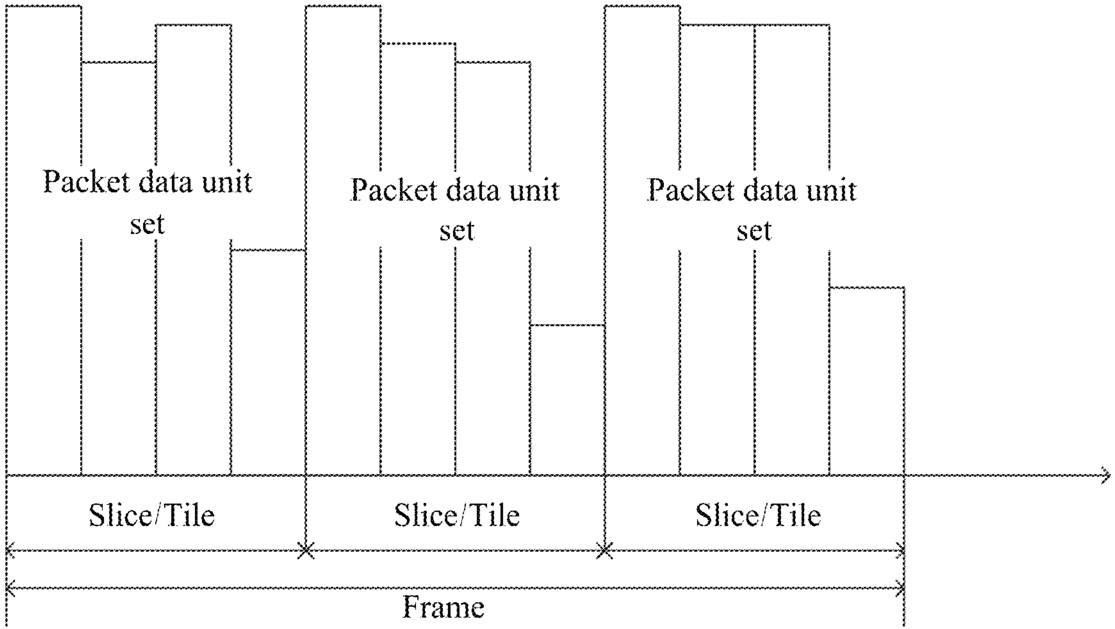
FIG. 2 is a schematic diagram showing data frame division according to an embodiment of the present disclosure.

In this embodiment, for the XR service modeled based on data frame, the same data frame can be divided into multiple packet data units. As shown in FIG. 2, one frame can be divided into multiple slices/tiles, and one slice/tile can be divided into multiple packet data units.

(5) Packet Data Unit Set Indication Information

Optionally, the sub-picture indication information includes an index of the sub-picture; or the slice indication information includes an index of the slice; or the tile indication information includes an index of the tile; or the QoS parameter corresponding to the packet data unit set includes at least a packet data unit set integrated handling indication (PSIHI). It should be noted that, in this embodiment, the schemes of the three indication information of the sub-picture indication information, the slice indication information and the tile indication information can exist in the form of one scheme or a combination of multiple schemes, for example: when the first indication information includes the sub-picture indication information, the sub-picture indication information can be an index of the sub-picture; when the first indication information includes the slice indication information, the slice indication information can be an index of the slice; when the first indication information includes the tile indication information, the tile indication information can be an index of the tile; when the first indication information includes the slice indication information and the tile indication information, the slice indication information can be the index of the slice, and the tile indication information can be the index of the tile; when the first indication information includes the slice indication information, the tile indication information and the sub-picture indication information, the slice indication information can be the index of the slice, the tile indication information can be the index of the tile, and the sub-picture indication information can be an index of the sub-picture.

(6) A QoS parameter corresponding to a packet data unit set, wherein the QoS parameter corresponding to the packet data unit set at least include a packet data unit set integrated handling indication (PSIHI).

Optionally, the packet data unit set indication information includes at least one of the following:

1) an index of a packet data unit set; in a possible implementation: the first indication information includes the index of a packet data unit set, and multiple SDUs corresponding to the same packet data unit set index can be considered as SDUs with an association relationship;
2) information of a window corresponding to the packet data unit set; the information of the window includes, for example, window index, window length, window start position indication information, window start position, etc. In a possible implementation: the first indication information includes the information of the window of the packet data unit set, and multiple SDUs in the window can be determined as SDUs with the association relationship according to the window length and window start position of the packet data unit set;
3) starting position and duration corresponding to the packet data unit set; in a possible implementation, the first indication information may include the starting position and duration corresponding to the packet data unit set, and multiple SDUs within the duration may be determined as SDUs with the association relationship based on the starting position and duration of the packet data unit set;
4) starting position and ending position corresponding to the packet data unit set; in a possible implementation, the first indication information may include the starting position and ending position corresponding to the packet data unit set, and multiple SDUs located between the starting position and the ending position may be determined as SDUs with the association relationship;
5) absolute time at which the packet data unit set is to be sent; in a possible implementation: the first indication information may include the absolute time at which the packet data unit set is to be sent, and the SDU to be sent before the absolute time may be determined as the SDU with the association relationship.

As an optional embodiment, the method further includes: obtaining the first indication information;

wherein the first indication information is carried in one of the following information:

(1) an SDU header; that is, the first indication information is carried in the header position of the SDU, and the target air-interface protocol layer of the communication device can obtain the first indication information according to the header of the SDU;
(2) an SDU Payload; that is, the first indication information is carried in the payload of the SDU; for example, the header of the SDU sent by the upper layer carries the first indication information; for the lower layer, the payload carries the first indication information; at this time, the target air-interface protocol layer needs to perform in-depth packet parsing when processing the data packet;
(3) inter-layer interaction information sent by an upper layer to an access stratum; this embodiment introduces inter-layer interaction information to transmit the first indication information; the upper layer (for example, the core network protocol layer) of the target air-interface protocol layer may transmit the interaction information to the access stratum (AS).

As an optional embodiment, the method further includes: determining whether an SDU discard processing function is activated or deactivated according to configuration information;

in case that the at least one SDU among the multiple SDUs with the association relationship needs to be discarded or is not successfully transmitted, the discarding the multiple SDUs with the association relationship and/or PDUs corresponding to the multiple SDUs with the association relationship includes:

in case that the SDU discard processing function is activated and the at least one SDU among the multiple SDUs with the association relationship needs to be discarded or is not successfully transmitted, discarding the multiple SDUs with the association relationship and/or PDUs corresponding to the multiple SDUs with the association relationship.

Optionally, the configuration information is configured for one of the following:

a bearer;

a logical channel;

a packet data unit set.

In this embodiment, the SDU discard processing function may refer to a processing function as to whether to discard the SDU, and the SDU discard processing function may be activated or deactivated based on the configuration. In case that the SDU discard processing function is activated, the target air-interface protocol layer executes the step of "discarding the multiple SDUs with the association relationship and/or the PDUs corresponding to the multiple SDUs with the association relationship in case that at least one SDU among the multiple SDUs with the association relationship needs to be discarded or is not successfully transmitted"; in case that the SDU discard processing function is deactivated, the target air-interface protocol layer does not execute the step of "discarding the multiple SDUs with the association relationship and/or the PDUs corresponding to the multiple SDUs with the association relationship in case that at least one SDU among the multiple SDUs with the association relationship needs to be discarded or is not successfully transmitted".

The configuration information may be configured based on a bearer, or based on a logical channel, or based on a packet data unit set, so as to determine whether the SDU discard processing function is activated or deactivated according to the configuration information. For example, configuring the configuration information based on a logical channel may refer to including the configuration information in the logical channel configuration information; configuring the configuration information based on a bearer may refer to including the configuration information regarding the activation or deactivation of the SDU discard processing function in the bearer configuration information; and configuring the configuration information based on a packet data unit set may refer to including the configuration information regarding the activation or deactivation of the SDU discard processing function in the packet data unit set configuration information. When the communication device is a network side device, the configuration information is configured by the network side device; when the communication device is a terminal, the configuration information may be configured by the network side device and sent to the terminal.

As an optional embodiment, the multiple SDUs with the association relationship each belong to a different protocol layer entity of the target air-interface protocol layer; or, at least some of the multiple SDUs with the association relationship belong to a same protocol layer entity of the target air-interface protocol layer.

Optionally, in case that the multiple SDUs with the association relationship each belong to a different protocol layer entity of the target air-interface protocol layer, the different protocol layer entities exchange second indication information with each other. Taking the target air-interface protocol layer being the PDCP layer as an example, the multiple SDUs with the association relationship may belong to the same PDCP entity or belong to different PDCP entities. If the multiple SDUs with the association relationship belong to different respective PDCP entities, the different PDCP entities need to exchange second indication information with each other.

Optionally, the second indication information includes at least one of the following.

1) Frame Indication Information about a Frame that Needs to be Discarded

Optionally, the frame indication information includes at least one of the following:

a: frame type indication information; in a possible implementation: the second indication information includes a frame type corresponding to the packet data unit to be discarded; or b: frame index indication information; in a possible implementation: the second indication information includes a frame index corresponding to the packet data unit to be discarded.

2) Slice Indication Information about a Slice that Needs to be Discarded

Optionally, the slice indication information includes an index of the slice. In a possible implementation: the second indication information includes the index of the slice to be discarded.

3) Tile Indication Information about a Tile that Needs to be Discarded

Optionally, the tile indication information includes an index of the tile. In a possible implementation: the second indication information includes the index of the tile to be discarded.

4) Sub-Picture Indication Information about a Sub-Picture that Needs to Be Discarded Optionally, the sub-picture indication information includes an index of the sub-picture. In a possible implementation: the second indication information includes an index of the sub-picture to be discarded.

5) Packet Data Unit Set Indication Information about a Packet Data Unit Set That Needs to be Discarded Optionally, the packet data unit set indication information includes at least one of the following:

a: the index of a packet data unit set; for example, the second indication information includes the index of the packet data unit set to be discarded;

b: information of a window corresponding to the packet data unit set;

the information of the window may include one or more of the following: window index, window length and window start position indication information, window start position, etc.; in a possible implementation, the second indication information includes information of the window corresponding to a packet data unit set, and it can be determined that the SDU in the window needs to be discarded according to the window length and the window start position of the packet data unit set;

c: the starting position and duration of the packet data unit set;

in a possible implementation, the second indication information may include a starting position and a duration corresponding to a packet data unit set, and it may be determined that multiple SDUs within the duration need to be discarded according to the starting position and the duration of the packet data unit set;

d: the starting position and the ending position corresponding to the packet data unit set;

in a possible implementation: the second indication information may include a starting position and an ending position corresponding to a packet data unit set, and it may be determined that multiple SDUs located between the starting position and the ending position need to be discarded;

e: the absolute time at which the packet data unit set is to be sent;

in a possible implementation: the second indication information may include an absolute time at which the packet data unit set is to be sent, and it can be determined that the SDU to be sent before the absolute time needs to be discarded.

6) Indication Information of an SDU in a Packet Data Unit Set that Needs To be Discarded.

As an optional embodiment, in case that at least one SDU among the multiple SDUs with the association relationship needs to be discarded or is not successfully transmitted, the discarding the multiple SDUs with the association relationship and/or PDUs corresponding to the multiple SDUs with the association relationship includes one of the following solutions 1 to 8.

Solution 1: When the timer corresponding to any one of the multiple SDUs with the association relationship expires, discarding the multiple SDUs with the association relationship and/or PDUs corresponding to the multiple SDUs with the association relationship; wherein one timer is maintained for each of the multiple SDUs with the association relationship.

In this embodiment, for multiple SDUs with an association relationship, one timer is maintained for each SDU. When any one or more timers expires, it is considered that the timer corresponding to each of the multiple SDUs with the association relationship expires, then all the SDUs with the association relationship are discarded, and/or the PDUs corresponding to all the SDUs with the association relationship are discarded.

Taking the target air-interface protocol layer being the PDCP layer as an example, one PDCP discard-related timer is maintained for each SDU in the multiple SDUs with the association relationship. In case that the PDCP discard-related timer corresponding to any one (or multiple) of the multiple SDUs with the association relationship expires, it is considered that the PDCP discard-related timer corresponding to each SDU in the multiple SDUs with the association relationship (the multiple SDUs with an association relationship can be one SDU set) expires. According to the method of processing after the PDCP discard-related timer expires, the multiple SDUs with the association relationship are all discarded, and/or the PDUs corresponding to the multiple SDUs with the association relationship can be discarded.

Solution 2: When the timer corresponding to any one of the multiple SDUs with the association relationship expires, discarding the multiple SDUs with the association relationship and/or PDUs corresponding to the multiple SDUs with the association relationship, and deleting or stopping the timer corresponding to each SDU in the multiple SDUs with the association relationship; wherein one timer is maintained for each of the multiple SDUs with the association relationship.

In this embodiment, for multiple SDUs with an association relationship, one timer is maintained for each SDU, and when any one or more timers expires, all the SDUs with the association relationship are discarded, and/or the PDUs corresponding to all the SDUs with the association relationship are discarded. It is also necessary to delete or stop the timer corresponding to each of the SDUs.

Taking the target air-interface protocol layer being the PDCP layer as an example, one PDCP discard-related timer is maintained for each SDU of the multiple SDUs with the association relationship. In case that the PDCP discard-related timer corresponding to any one (or multiple) of the multiple associated SDUs expires, the multiple SDUs with the association relationship (the multiple SDUs with an association relationship may be one SDU set) are all discarded, and the PDUs corresponding to the multiple SDUs with the association relationship may be discarded, and/or the PDCP discard-related timer corresponding to each SDU is deleted/stopped.

Solution 3: When the timer corresponding to the multiple SDUs with the association relationship expires, discarding the multiple SDUs with the association relationship and/or PDUs corresponding to the multiple SDUs with the association relationship, wherein one timer is maintained for the multiple SDUs with the association relationship.

Optionally, the method further includes: in case that one timer is maintained for the multiple SDUs having the association relationship, starting the timer when a first SDU among the multiple SDUs having the association relationship is received.

In this embodiment, only one timer is maintained for multiple SDUs with an association relationship, and when the timer expires, all SDUs with the association relationship are discarded, and/or the PDUs corresponding to all SDUs with the association relationship are discarded. The timer is started when the target air-interface protocol layer receives the first SDU among the multiple SDUs with the association relationship.

Taking the target air-interface protocol layer being the PDCP layer as an example, only one PDCP discard-related timer is maintained for multiple SDUs with an association relationship. When the first SDU among the multiple SDUs with the association relationship (the multiple SDUs with an association relationship can be one SDU set) is received, the PDCP discard-related timer is started. If the PDCP discard-related timer expires, all the SDUs with an association relationship are discarded, and/or the PDUs corresponding to the multiple SDUs with the association relationship can be discarded.

Solution 4: When it is determined, according to the congestion indication information sent by the lower layer of the target air-interface protocol layer, that at least one SDU among the multiple SDUs with association relationship needs to be discarded, discarding the multiple SDUs with association relationship.

The target air-interface protocol layer can determine whether one of the multiple SDUs with the association relationship needs to be discarded according to the congestion indication information sent by the lower layer (for example, when congested, determine whether to discard the SDU according to the frame type corresponding to the packet data unit corresponding to the SDU, for example, P frame and/or B frame is preferentially discard). When it is determined that one or more SDUs need to be discarded, all the SDUs with the association relationship are discarded.

Taking the target air-interface protocol layer being the PDCP layer and the communication device being a terminal as an example, the lower layer is, e.g., the MAC layer or the physical layer, the MAC layer or the physical layer of the terminal sends congestion indication information to the PDCP layer, and the PDCP layer determines whether a target SDU needs to be discarded based on the congestion indication information. If the target SDU needs to be discarded, the target SDU and the SDUs associated with the target SDU need to be discarded.

Solution 5: in case that it is determined, according to indication information sent by a lower layer of the target air-interface protocol layer, that a PDU corresponding to at least one SDU among the multiple SDUs with the association relationship is lost, deleting the multiple SDUs with the association relationship and/or PDUs corresponding to the multiple SDUs with the association relationship at the target air-interface protocol layer.

In this embodiment, the target air-interface protocol layer can determine whether one or more SDUs among the multiple SDUs with the association relationship are lost during air-interface transmission based on the indication information of the lower layer. If it is determined that one or more SDUs are lost, all SDUs that have an association relationship with the lost SDU are deleted at the target air-interface protocol layer, and/or PDUs associated with these SDUs with the association relationship are deleted at the target air-interface protocol layer.

Taking the target air-interface protocol layer being the PDCP layer as an example, the lower layer of the target air-interface protocol layer is, for example, the RLC layer or the MAC layer. The PDCP layer can determine, based on the indication information transmitted by the RLC layer or the MAC layer, that the PDUs corresponding to one or more SDUs are lost during air-interface transmission. The PDCP layer then deletes other SDUs in the SDU set that are associated with the lost SDUs, and/or deletes the PDUs associated with all these SDUs.

Solution 6: for protocol layer entity reestablishment in the target air-interface protocol layer, for a data radio bearer (DRB) in an un-acknowledged mode, in case that the protocol layer entity is a receiving entity, SDUs stored in the protocol layer entity include multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer.

In this embodiment, the target air-interface protocol layer may include multiple protocol layer entities, and the multiple SDUs with the association relationship received by the target air-interface protocol layer may be stored in one or more protocol layer entities. The multiple SDUs with the association relationship may be one SDU set, and for protocol layer entity reestablishment in the target air-interface protocol layer, if the protocol layer entity is a receiving entity, for an un-acknowledged mode (UM) DRB, if any one or more SDUs in the SDU set are not successfully received, when the protocol layer entity reports its stored SDUs to the upper layer of the target air-interface protocol layer, the SDU that is not successfully received and other SDUs associated with the SDU do not need to be sent to the upper layer and are directly discarded.

Taking the target air-interface protocol layer being the PDCP layer as an example, for PDCP entity reestablishment, if the PDCP entity is a PDCP receiving entity, for a UM DRB, if any SDU in the SDU set with the association relationship (i.e., multiple SDUs with the association relationship form one SDU set) is not successfully received, then when the PDCP receiving entity submits all stored PDCP SDUs to the upper layer, there is no need for the PDCP receiving entity to send the SDUs with the association relationship, and the PDCP receiving entity can directly discard them. It should be noted that, when the PDCP receiving entity sends all stored PDCP SDUs to the upper layer, if there are other SDUs than the SDU set, the other SDUs are sent normally.

Solution 7: for protocol layer entity release in the target air-interface protocol layer, for a DRB in the un-acknowledged mode and/or a DRB in an acknowledged mode, in case that SDUs stored in the protocol layer entity include multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer.

In this embodiment, for the protocol layer entity release in the target air-interface protocol layer, for the un-acknowledged mode (UM) DRB and/or the acknowledged mode (AM) DRB, if any one or more SDUs of the multiple SDUs with the association relationship are not successfully received, then when the protocol layer entity reports its stored SDU to the upper layer of the target air-interface protocol layer, the SDU that is not successfully received and other SDUs that are associated with the SDU do not need to be sent to the upper layer and are directly discarded.

Taking the target air-interface protocol layer being the PDCP layer as an example, if the upper layer requests a PDCP entity release, for a UM DRB and/or an AM DRB, when the PDCP receiving entity sends the PDCP SDU stored by the PDCP receiving entity to the upper layer, if any SDU associated with the PDCP SDU is not successfully received, the PDCP entity does not need to send the associated SDUs to the upper layer and can directly discard them.

Solution 8: in case that the multiple SDUs with the association relationship belong to one packet data unit set, and one or more SDUs among the multiple SDUs with the association relationship have not been successfully sent when an absolute time at which the packet data unit set is to be sent is reached, discarding the multiple SDUs with the association relationship and/or PDUs corresponding to the multiple SDUs with the association relationship.

In this embodiment, if the multiple SDUs with the association relationship all belong to the same packet data unit set, and an absolute time to send the packet data unit set is set, when the absolute time is reached, if any one or more of the multiple SDUs with the association relationship are not successfully sent, then all the SDUs with the association relationship are discarded, and/or the PDUs corresponding to the multiple SDUs with the association relationship are discarded.

The embodiments of the present disclosure propose the above-mentioned methods for discarding SDUs with the association relationship. A target air-interface protocol layer of the communication device can discard the SDUs based on any of the above-mentioned methods, so as to avoid unnecessary data transmission over the air interface, thereby improving the resource utilization of the system.

Hereinafter, the data unit processing method of the present disclosure is described below through specific embodiments of the above-mentioned solutions.

The data unit processing method according to an embodiment of the present disclosure includes the following steps 1 to 3.

Step 1: Determine an association relationship between SDUs.

The target air-interface protocol layer of the communication device determines the association relationship between SDUs according to first indication information.

The communication device may be a network side device or a terminal. For downlink data transmission, the communication device may be a network side device, such as a gNB, a distributed unit (DU), or a central unit (CU).

The target air-interface protocol layer may include but is not limited to: a PDCP layer, an RLC layer, an MAC layer. Preferably, the target air-interface protocol layer is a PDCP layer. The same processing process is also applicable to the RLC layer and MAC layer, which will not be described in detail here.

The first indication information may include one or more of the following:

- a frame index corresponding to the packet data unit;
- a frame type corresponding to the packet data unit;
- a slice index;
- a tile index;
- a sub-picture index;
- a packet data unit set index;
- information of a window of a packet data unit set;
- a starting position and a duration of the packet data unit set;
- a starting position and an ending position of the packet data unit set;
- an absolute time at which the packet data unit set is to be sent.

The first indication information may be obtained in any of the following ways:

- carried in the SDU header;
- carried in the SDU payload;
- carried in the inter-layer interaction information sent by an upper layer to the access stratum.

In a possible implementation, if the first indication information includes an index of a packet data unit set, multiple SDUs corresponding to the same packet data unit set index may be considered as SDUs having an association relationship;

- if the first indication information includes the information of the window of the packet data unit set, it can be determined, according to the window length and the window start position of the packet data unit set, that the multiple SDUs in the window are SDUs with an association relationship;
- if the first indication information includes the frame index corresponding to the packet data unit, the frame type corresponding to the packet data unit, the slice index, etc., then SDUs with exactly the same frame index, frame type corresponding to the packet data unit, and slice index can be considered as SDUs with an association relationship.

Step 2: SDU and/or PDU discard processing execution process.

For multiple SDUs with an association relationship, if one or more of the SDUs need to be discarded or the SDU is not successfully transmitted during air-interface transmission, all SDUs and/or PDUs associated with the SDU that needs to be discarded or is not successfully transmitted need to be discarded.

Step 3: The SDU discard processing function performed in step 2 may be activated or deactivated based on configuration information, and the configuration information may be configured for one of the following:

configured based on a bearer;

configured based on a logical channel;

configured based on a packet data unit set.

Optionally, the configuration information of the SDU discard processing function may be added in a radio resource control (RRC) reconfiguration message when configuring a DRB or a logical channel through the RRC reconfiguration message.

In a possible implementation, when performing SDU and/or PDU discard processing, if the SDU discard processing function is activated, one of the following 8 operations may be performed for SDU and/or PDU discard.

1) Taking the target air-interface protocol layer being the PDCP layer as an example, one PDCP discard-related timer is maintained for each SDU. If the PDCP discard-related timer corresponding to any one or more SDUs in the associated SDUs expires, it is considered that the PDCP discard-related timer corresponding to each SDU in the SDU set with the association relationship expires. Then, according to the processing after the PDCP discard-related timer expires, the SDUs with the association relationship and the PDUs corresponding to the SDUs are all discarded.

2) Taking the target air-interface protocol layer being the PDCP layer as an example, one PDCP discard-related timer is maintained for each SDU. If the PDCP discard timer corresponding to any one or more SDUs in the associated SDUs expires, each SDU in the SDU set with the association relationship and the PDU associated with the SDU are discarded, and the PDCP discard-related timer corresponding to each SDU is deleted/stopped.

3) Taking the target air-interface protocol layer being the PDCP layer as an example, only one PDCP discard-related timer is maintained for multiple SDUs with an association relationship. When the first SDU in the SDU set formed by the multiple SDUs with the association relationship is received, the PDCP discard-related timer is started. If the PDCP discard-related timer expires, the multiple SDUs with the association relationship and the PDUs corresponding to the multiple SDUs are discarded.

4) The lower layer of the communication device (e.g., the MAC layer or the physical layer) sends congestion indication information to the upper layer (e.g., the PDCP layer), and the target air-interface protocol layer of the communication device determines whether one SDU needs to be discarded according to the congestion indication information (for example, when in congestion, the target air-interface protocol layer determines whether to discard the SDU according to the frame type corresponding to the packet data unit corresponding to the SDU, for example P frame and/or B frame is discarded preferentially). If the SDU needs to be discarded, all SDUs associated with the SDU need to be discarded.

5) The target air-interface protocol layer of the communication device determines that a PDU corresponding to one SDU is lost during air-interface transmission based on the indication information of the lower layer (for example, the PDCP layer determines that a PDU corresponding to one SDU is lost during air-interface transmission based on the indication information of the RLC layer or the MAC layer), then the target air-interface protocol layer deletes other SDUs in the SDU set associated with the SDU, and the PDUs associated with the SDUs in the SDU set.

Taking the target air-interface protocol layer being the PDCP layer as an example, the MAC layer of the communication device determines, based on the HARQ transmission feedback information, that the TB is still not successfully transmitted after N retransmissions, then the MAC layer indicates an RLC PDU index of the failed transmission to the RLC layer, the RLC determines an RLC SDU index based on the RLC PDU index, and indicates it to the PDCP layer, and the PDCP layer can determine the corresponding PDCP SDU index accordingly. According to the step 1, the PDCP layer determines other SDUs in the SDU set that have an association relationship with the SDU, and the PDCP PDUs corresponding to these SDUs, and then deletes these SDUs with the association relationship and/or PDUs.

6) Taking the target air-interface protocol layer being the PDCP layer as an example, for the PDCP entity reestablishment, if the PDCP entity is a PDCP receiving entity, for a UM DRB, if any one or more SDUs in an SDU set with an association relationship (the SDU set is composed of the multiple SDUs with the association relationship) are not successfully received, then when the PDCP receiving entity sends its stored PDCP SDU to the upper layer, it is not necessary for the PDCP receiving entity to send the SDUs in the SDU set and the PDCP receiving entity can directly discard them.

7) Taking the target air-interface protocol layer being the PDCP layer as an example, if the upper layer requests a PDCP entity release, for a UM DRB and/or an AM DRB, when the PDCP receiving entity sends the PDCP SDU stored by the PDCP receiving entity to the upper layer, if any one or more SDUs associated with the PDCP SDU are not successfully received, the PDCP SDU does not need to be sent to the upper layer and can be directly discarded.

8) If multiple SDUs with an association relationship belong to one packet data unit set, and when the absolute time at which the packet data unit set is to be sent is reached, one or more SDUs among the multiple SDUs with the association relationship have not been successfully sent, the multiple SDUs with the association relationship and/or PDUs corresponding to the multiple SDUs with the association relationship are discarded.

Based on the above solutions, the multiple SDUs with the association relationship may belong to the same PDCP entity or to different PDCP entities. If the SDUs with the association relationship belong to different PDCP entities, the different PDCP entities need to exchange second indication information with each other, and the second indication information may include one of or a combination of the following contents:

a frame index corresponding to the packet data unit that needs to be discarded;

a frame type corresponding to the packet data unit that needs to be discarded;

an index of a slice that needs to be discarded;

an index of a tile that needs to be discarded;

an index of a sub-picture that needs to be discarded;

an index of a packet data unit set that needs to be discarded;

information of a window of a packet data unit set that needs to be discarded;

a starting position and a duration of the packet data unit set that needs to be discarded;

a starting position and an ending position of the packet data unit set that needs to be discarded;

an absolute time at which the packet data unit set that needs to be discarded is to be sent.

In the embodiments of the present disclosure, the target air-interface protocol layer of the communication device determines the association relationship between SDUs according to the first indication information. For SDUs with an association relationship, if one or more SDUs need to be discarded or the SDUs are not successfully transmitted in air-interface transmission, the SDU that needs to be discarded or is not successfully transmitted and all SDUs/PDUs associated with the SDU need to be discarded, so as to avoid unnecessary data transmission over the air-interface, thereby improving transmission efficiency and improving system resource utilization.

The above embodiments introduce the data unit processing method of the present disclosure. The following embodiments will further illustrate the corresponding apparatus with reference to the accompanying drawings.

Figures 3, 4:
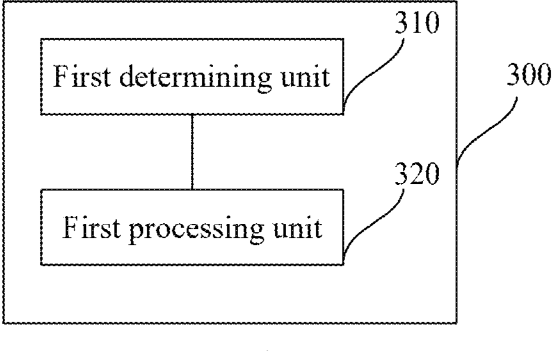
FIG. 3 is a schematic structural diagram of a data unit processing apparatus according to an embodiment of the present disclosure.
FIG. 4 is a schematic structural diagram of a communication device according to an embodiment of the present disclosure.

Specifically, as shown in FIG. 3, an embodiment of the present disclosure provides a data unit processing apparatus 300, including:

a first determining unit 310, configured to determine, at a target air-interface protocol layer, an association relationship between service data units (SDUs) according to first indication information; and a first processing unit 320, configured to in case that at least one SDU among the multiple SDUs with the association relationship needs to be discarded or is not successfully transmitted, discard the multiple SDUs with the association relationship and/or the protocol data units (PDUs) corresponding to the multiple SDUs with the association relationship.

Optionally, the target air-interface protocol layer includes one of the following:

a packet data convergence protocol (PDCP) layer;

a radio link control (RLC) layer;

a medium access control (MAC) layer.

Optionally, the first indication information includes at least one of the following:

frame indication information;

sub-picture indication information;

slice indication information;

tile indication information;

packet data unit set indicatino information; or a QoS parameter corresponding to a packet data unit set.

Optionally, the apparatus further includes:

an obtaining unit, configured to obtain the first indication information;

wherein the first indication information is carried in one of the following information:

an SDU header;

an SDU payload;

inter-layer interaction information sent by an upper layer to an access stratum.

Optionally, the apparatus further includes:

a second determining unit, configured to determine whether an SDU discard processing function is activated or deactivated according to configuration information;

the first processing unit is specifically configured to: when the SDU discard processing function is activated, in case that at least one SDU among multiple SDUs with an association relationship needs to be discarded or is not successfully transmitted, discard the multiple SDUs with the association relationship and/or PDUs corresponding to the multiple SDUs with the association relationship.

Optionally, the configuration information is configured for one of the following:

a bearer;

a logical channel;

a packet data unit set.

Optionally, the first processing unit is configured to perform one of the following:

in case that a timer corresponding to any one of the multiple SDUs with the association relationship expires, discarding the multiple SDUs with the association relationship and/or PDUs corresponding to the multiple SDUs with the association relationship; wherein one timer is maintained for each of the multiple SDUs with the association relationship;

in case that a timer corresponding to any one of the multiple SDUs with the association relationship expires, discarding the multiple SDUs with the association relationship and/or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding the multiple SDUs with the association relationship and/or PDUs corresponding to the multiple SDUs with the association relationship, wherein one timer is maintained for the multiple SDUs with the association relationship;

in case that it is determined, according to the congestion indication information sent by the lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting the multiple SDUs with the association relationship and/or PDUs corresponding to the multiple SDUs with the association relationship at the target air-interface protocol layer;

for protocol layer entity reestablishment in the target air-interface protocol layer, if the protocol layer entity is a receiving entity, for a data radio bearer (DRB) in an un-acknowledged mode, when the SDU stored in the protocol layer entity includes multiple SDUs with an association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for a DRB in the un-acknowledged mode and/or a DRB in an acknowledged mode, when the SDU stored in the protocol layer entity includes multiple SDUs with an association relationship, and at least one of the multiple SDUs with the association relationship is not successfully received, discarding the multiple SDUs with the association relationship and not delivering the multiple SDUs with the association relationship to the upper layer of the target air-interface protocol layer;

in case that the multiple SDUs with the association relationship belong to one packet data unit set, and one or more SDUs among the multiple SDUs with the association relationship are not successfully sent when an absolute time at which the packet data unit set is to be sent is reached, discarding the multiple SDUs with the association relationship and/or PDUs corresponding to the multiple SDUs with the association relationship.

Optionally, the apparatus further includes:

a second processing unit, configured to, in case that one timer is maintained for the multiple SDUs with the association relationship, upon a first SDU among the multiple SDUs with the association relationship being received, start the timer.

Optionally, the multiple SDUs with the association relationship each belong to a different protocol layer entity of the target air-interface protocol layer; or, at least some of the multiple SDUs with the association relationship belong to a same protocol layer entity of the target air-interface protocol layer.

Optionally in case that the multiple SDUs with the association relationship each belong to the different protocol layer entity of the target air-interface protocol layer, the different protocol layer entities exchange second indication information with each other;

wherein the second indication information includes at least one of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

Optionally, the frame indication information includes at least one of the following:

frame type indication information; or frame index indication information.

Optionally, the sub-picture indication information includes an index of the sub-picture; or, the slice indication information includes an index of the slice; or, the tile indication information includes an index of the tile; or, the QoS parameter corresponding to the packet data unit set includes at least a packet data unit set integrated handling indication (PSIHI).

Optionally, the packet data unit set indication information includes at least one of the following:

an index of the packet data unit set;

information of a window corresponding to the packet data unit set;

a starting position and a duration of the packet data unit set;

a starting position and an ending position of the packet data unit set; or an absolute time at which the packet data unit set is to be sent.

In the embodiment of the present disclosure, the target air-interface protocol layer of the communication device determines the association relationship between SDUs based on the first indication information, and when at least one SDU among multiple SDUs with an association relationship needs to be discarded or is not successfully transmitted, all SDUs with an association relationship and/or the PDUs corresponding to the SDUs are discarded, so as to avoid unnecessary data transmission over the air interface, thereby improving transmission efficiency and improving system resource utilization.

It should be noted here that the above-mentioned apparatus provided in the embodiment of the present disclosure can implement all the method steps implemented in the above-mentioned method embodiments, and can achieve the same technical effect. The parts and beneficial effects that are the same as the method embodiment in this embodiment will not be described in detail here.

It should be noted that the division of units in the embodiments of the present disclosure is illustrative and is only a logical function division. There may be other division methods in actual implementation. In addition, various functional units in the embodiments of the present disclosure may be integrated into one processing unit, or each unit may exist physically separately, or two or more units may be integrated into one unit. The above-mentioned integrated unit may be implemented in the form of hardware or in the form of software functional units.

If the integrated unit is implemented in the form of a software functional unit and sold or used as an independent product, it can be stored in a processor-readable storage medium. Based on such an understanding, essential parts, or parts contributing to the related art, of the technical solution of the present disclosure, or all or a part of the technical solution may be implemented in form of a software product. The computer software product is stored in a storage medium, including several instructions to enable a computer device (which can be a personal computer, server, or network device, etc.) or a processor to perform all or some of the steps of the method described in the embodiments of the present disclosure. The aforementioned storage medium includes: Universal Serial Bus (USB) flash drive, removable hard disk, read-only memory (ROM), random access memory (RAM), magnetic disk or optical disc and other media that can store program codes.

As shown in FIG. 4, an embodiment of the present disclosure further provides a communication device, which may be a terminal or a network side device. The communication device includes: a memory 420, a transceiver 400, and a processor 410; wherein the memory 420 is configured to store a computer program; the transceiver 400 is configured to send and receive data under the control of the processor 410; the processor 410 is configured to read the computer program in the memory and perform the following operations:

determining, by a target air-interface protocol layer, an association relationship between service data units (SDUs) according to first indication information;

in case that at least one SDU among the multiple SDUs with the association relationship needs to be discarded or is not successfully transmitted, discarding the multiple SDUs with the association relationship and/or protocol data units (PDUs) corresponding to the multiple SDUs with the association relationship.

Optionally, the target air-interface protocol layer includes one of the following:

a PDCP layer;

an RLC layer;

an MAC layer.

Optionally, the first indication information includes at least one of the following:

frame indication information;

sub-picture indication information;

slice indication information;

tile indication information;

packet data unit set indication information; or a QoS pararmeter correspomdong to a packet data unit set.

Optionally, the processor is configured to read the computer program in the memory and perform the following operations:

obtaining the first indication information;

wherein the first indication information is carried in one of the following information:

an SDU header;

an SDU payload;

inter-layer interaction information sent by an upper layer to an access stratum.

Optionally, the processor is configured to read the computer program in the memory and perform the following operations:

determining whether an SDU discard processing function is activated or deactivated according to configuration information;

in case that the SDU discard processing function is activated and the at least one SDU among the multiple SDUs with the association relationship needs to be discarded or is not successfully transmitted, discarding the multiple SDUs with the association relationship and/or PDUs corresponding to the multiple SDUs with the association relationship.

Optionally, the configuration information is configured for one of the following:

a bearer;

a logical channel;

a packet data unit set.

Optionally, the processor is configured to read the computer program in the memory and perform one of the following operations:

in case that a timer corresponding to any one of the multiple SDUs with the association relationship expires, discarding the multiple SDUs with the association relationship and/or PDUs corresponding to the multiple SDUs with the association relationship; wherein one timer is maintained for each of the multiple SDUs with the association relationship;

in case that a timer corresponding to any one of the multiple SDUs with the association relationship expires, discarding the multiple SDUs with the association relationship and/or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding the multiple SDUs with the association relationship and/or PDUs corresponding to the multiple SDUs with the association relationship, wherein one timer is maintained for the multiple SDUs with the association relationship;

in case that it is determined, according to congestion indication information sent by a lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting the multiple SDUs with the association relationship and/or PDUs corresponding to the multiple SDUs with the association relationship at the target air-interface protocol layer;

for protocol layer entity reestablishment in the target air-interface protocol layer, if the protocol layer entity is a receiving entity, for a data radio bearer (DRB) in an un-acknowledged mode, when the SDU stored in the protocol layer entity includes a plurality of SDUs with an association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for a DRB in the un-acknowledged mode and/or a DRB in an acknowledged mode, when the SDU stored in the protocol layer entity includes multiple SDUs with an association relationship, and at least one of the multiple SDUs with the association relationship is not successfully received, discarding the multiple SDUs with the association relationship and not delivering the multiple SDUs with the association relationship to the upper layer of the target air-interface protocol layer;

in case that the multiple SDUs with the association relationship belong to one packet data unit set, and one or more SDUs among the multiple SDUs with the association relationship have not been successfully sent when an absolute time at which the packet data unit set is to be sent is reached, discarding the multiple SDUs with the association relationship and/or PDUs corresponding to the multiple SDUs with the association relationship.

Optionally, the processor is configured to read the computer program in the memory and perform the following operations:

in case that one timer is maintained for the multiple SDUs with the association relationship, upon a first SDU among the multiple SDUs with the association relationship being received, starting the timer.

Optionally, the multiple SDUs with the association relationship each belong to a different protocol layer entity of the target air-interface protocol layer; or, at least some of the multiple SDUs with the association relationship belong to a same protocol layer entity of the target air-interface protocol layer.

Optionally in case that the multiple SDUs with the association relationship each belong to the different protocol layer entity of the target air-interface protocol layer, the different protocol layer entities exchange second indication information with each other;

wherein the second indication information includes at least one of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

Optionally, the frame indication information includes at least one of the following:

frame type indication information; or frame index indication information.

Optionally, the sub-picture indication information includes an index of the sub-picture; or, the slice indication information includes an index of the slice; or, the tile indication information includes an index of the tile; or, the QoS parameter corresponding to the packet data unit set includes at least a packet data unit set integrated handling indication (PSIHI).

Optionally, the packet data unit set indication information includes at least one of the following:

an index of the packet data unit set;

information of a window corresponding to the packet data unit set;

a starting position and a duration of the packet data unit set;

a starting position and an ending position of the packet data unit set; or an absolute time at which the packet data unit set is to be sent.

In FIG. 4, a bus architecture may include any number of interconnected buses and bridges, and connects various circuits including one or more processors represented by the processor 410 and memory represented by the memory 420. The bus architecture may also connect various other circuits such as peripherals, voltage regulators and power management circuits, which is well known in the art. Therefore, a detailed description thereof is omitted herein. A bus interface provides an interface. The transceiver 400 may be plural elements, i.e., including a transmitter and a receiver, to allow for communication with various other apparatuses on the transmission medium. The processor 410 is responsible for supervising the bus architecture and normal operation and the memory 420 may store the data being used by the processor 410 during operation.

The processor 410 may be a central processing unit (CPU), an application specific integrated circuit (ASIC), a field programmable gate array (FPGA) or a complex programmable logic device (CPLD). The processor may also adopt a multi-core architecture.

It should be noted here that the above-mentioned communication device provided in the embodiment of the present disclosure can implement all the method steps implemented in the above-mentioned method embodiments, and can achieve the same technical effect. The parts and beneficial effects in this embodiment that are the same as the method embodiments will not be described in detail here.

A specific embodiment of the present disclosure further provides a processor-readable storage medium, on which a computer program is stored, wherein the program, when executed by the processor, implements the steps of the data unit processing method as described above. The same technical effect can be achieved, so it will not be repeated here to avoid repetition. The readable storage medium can be any available medium or data storage apparatus that can be accessed by the processor, including but not limited to magnetic storage (such as floppy disk, hard disk, tape, magneto-optical (MO)), optical storage (such as compact disc (CD), digital versatile disc (DVD), Blu-ray disc (BD), high-definition versatile disc (HVD)), and semiconductor storage (such as ROM, erasable programmable read-only memory (EPROM), electrically erasable programmable read only memory (EEPROM), non-volatile memory (NAND FLASH), solid-state disk (SSD)), etc.

It should be understood by those skilled in the art that the embodiments of the present disclosure may be provided as methods, systems, or computer program products. Therefore, the present disclosure may take the form of a complete hardware embodiment, a complete software embodiment, or an embodiment combining software and hardware. Moreover, the present disclosure may take the form of a computer program product implemented on one or more computer-usable storage media (including but not limited to magnetic disk storage and optical storage) containing computer-usable program codes.

The present disclosure is described with reference to the flowcharts and/or block diagrams of the methods, devices (systems), and computer program products according to the embodiments of the present disclosure. It will be understood that each flow and/or block of the flow diagrams and/or block diagrams, and combinations of flows and/or blocks in the flow diagrams and/or block diagrams, can be implemented by computer executable instructions. These computer executable instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in the flow diagram flow or flows and/or block diagram block or blocks.

These computer executable instructions may also be stored in a processor-readable storage that can direct a computer or other programmable data processing device to function in a particular manner, such that the instructions stored in the processor-readable storage produce an article of manufacture including instruction means which implement the function specified in the flow diagram flow or flows and/or block diagram block or blocks.

The computer executable instructions may also be loaded onto a computer or other programmable data processing device to cause a series of operational steps to be performed on the computer or other programmable device to produce a computer-implemented process, such that the instructions which are executed on the computer or other programmable device provide steps for implementing the functions specified in the flow diagram flow or flows and/or block diagram block or blocks.

It should be noted that it should be understood that the division of the above modules is only a division of logical functions. In actual implementation, they can be fully or partially integrated into one physical entity, or they can be physically separated. These modules can all be implemented in the form of software called by processing elements; they can also be all implemented in the form of hardware; some modules can also be implemented in the form of software called by processing elements, and some modules can be implemented in the form of hardware. For example, the determining module can be a separately established processing element, or it can be integrated in a chip of the above-mentioned apparatus. In addition, it can also be stored in the memory of the above-mentioned apparatus in the form of program codes, and called and executed by a processing element of the above-mentioned apparatus. The implementation of other modules is similar. In addition, these modules can be fully or partially integrated together, or they can be implemented independently. The processing element described here can be an integrated circuit with signal processing capabilities. In the implementation process, each step of the above method or each module above can be accomplished by a hardware integrated logic circuit in the processor element or instructions in the form of software.

For example, each module, unit, sub-unit or sub-module may be one or more integrated circuits configured to implement the above method, such as one or more application specific integrated circuits (ASICs), or one or more digital signal processors (DSPs), or one or more field programmable gate arrays (FPGAs). For another example, when a module above is implemented in the form of a processing element calling program codes, the processing element may be a general-purpose processor, such as a central processing unit (CPU) or other processor that can call program codes. For another example, these modules may be integrated together and implemented in the form of a system-on-a-chip (SOC).

Terms “first”, “second” and the like in the specification and claims of the present disclosure are used to distinguish similar objects, and are not necessarily used to describe a specific order or sequence. It should be understood that the data used in this way can be interchanged where appropriate, so that the embodiments of the present disclosure described here, such as those illustrated or described here, are implemented in a sequence other than the illustrated sequence. In addition, the terms “including” and “having” and any of their variations are intended to cover non-exclusive inclusions, for example, a process, method, system, product or device that includes a series of steps or units is not necessarily limited to those steps or units clearly listed, but may include other steps or units that are not clearly listed or inherent to these processes, methods, products or devices. In addition, the use of “and/or” in the specification and claims represents at least one of the connected objects, for example, A and/or B and/or C indicates the inclusion of 7 situations: only A exists, only B exists, only C exists, and both A and B exist, both B and C exist, both A and C exist, and all of A, B and C exist. Similarly, the expression “at least one of A and B” in the specification and claims should be understood as “only A exists, only B exists, or both A and B exist”.

Obviously, those skilled in the art can make various changes and modifications to the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A data unit processing method, comprising:

determining, by a communication device, an association relationship between service data units (SDUs);

in case that at least one SDU among the multiple SDUs with the association relationship needs to be discarded or is not successfully transmitted, discarding one or more of the multiple SDUs with the association relationship or protocol data units (PDUs) corresponding to the multiple SDUs with the association relationship;

the method further comprising:

determining whether an SDU discard processing function is activated or deactivated according to configuration information;

wherein the in case that at least one SDU among the multiple SDUs with the association relationship needs to be discarded or is not successfully transmitted, discarding one or more of the multiple SDUs with the association relationship or PDUs corresponding to the multiple SDUs with the association relationship comprises:

in case that the SDU discard processing function is activated and the at least one SDU among the multiple SDUs with the association relationship needs to be discarded or is not successfully transmitted, discarding one or more of the multiple SDUs with the association relationship or PDUs corresponding to the multiple SDUs with the association relationship.

2. The method according to claim 1, wherein the determining, by the communication device, the association relationship between the SDUs comprises: determining, by a target air-interface protocol layer of the communication device, the association relationship between the SDUs, the target air-interface protocol layer comprises one of the following:

a packet data convergence protocol (PDCP) layer;

a radio link control (RLC) layer;

a medium access control (MAC) layer.

3. The method according to claim 1, wherein the determining, by the communication device, the association relationship between the SDUs comprises: determining, by the communication device, the association relationship between the SDUs according to first indication information, the first indication information comprises one or more of the following:

frame indication information;

sub-picture indication information;

slice indication information;

tile indication information;

packet data unit set indication information;

a quality of service (QOS) parameter corresponding to a packet data unit set.

4. The method according to claim 3, further comprising:

obtaining the first indication information;

wherein the first indication information is carried in one of the following information:

an SDU header;

an SDU payload;

inter-layer interaction information sent by an upper layer to an access stratum.

5. The method according to claim 1, wherein the configuration information is configured for one of the following:

a bearer;

a logical channel;

a packet data unit set.

6. The method according to claim 2, wherein in case that the at least one SDU among the multiple SDUs with the association relationship needs to be discarded or is not successfully transmitted, the discarding one or more of the multiple SDUs with the association relationship or PDUs corresponding to the multiple SDUs with the association relationship comprises one of the following:

in case that a timer corresponding to any one of the multiple SDUs with the association relationship expires, discarding one or more of the multiple SDUs with the association relationship or PDUs corresponding to the multiple SDUs with the association relationship; wherein one timer is maintained for each of the multiple SDUs with the association relationship;

in case that a timer corresponding to any one of the multiple SDUs with the association relationship expires, discarding one or more of the multiple SDUs with the association relationship or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding one or more of the multiple SDUs with the association relationship or PDUs corresponding to the multiple SDUs with the association relationship, wherein one timer is maintained for the multiple SDUs with the association relationship;

in case that it is determined, according to congestion indication information sent by a lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting one or more of the multiple SDUs with the association relationship or PDUs corresponding to the multiple SDUs with the association relationship at the target air-interface protocol layer;

for protocol layer entity reestablishment in the target air-interface protocol layer, for a data radio bearer (DRB) in an un-acknowledged mode, in case that the protocol layer entity is a receiving entity, SDUs stored in the protocol layer entity comprise multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for one or more of a DRB in the un-acknowledged mode or a DRB in an acknowledged mode, in case that SDUs stored in the protocol layer entity comprise multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

in case that the multiple SDUs with the association relationship belong to one packet data unit set, and one or more SDUs among the multiple SDUs with the association relationship have not been successfully sent when an absolute time at which the packet data unit set is to be sent is reached, discarding one or more of the multiple SDUs with the association relationship or PDUs corresponding to the multiple SDUs with the association relationship.

7. The method according to claim 6, further comprising: in case that one timer is maintained for the multiple SDUs with the association relationship, upon a first SDU among the multiple SDUs with the association relationship being received, starting the timer.

8. The method according to claim 2, wherein the multiple SDUs with the association relationship each belong to a different protocol layer entity of the target air-interface protocol layer;

or, at least some of the multiple SDUs with the association relationship belong to a same protocol layer entity of the target air-interface protocol layer;

wherein in case that the multiple SDUs with the association relationship each belong to the different protocol layer entity of the target air-interface protocol layer, the different protocol layer entities exchange second indication information with each other;

wherein the second indication information comprises one or more of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

9. The method according to claim 3, wherein the frame indication information comprises one or more of the following:

frame type indication information; or frame index indication information;

or, wherein the sub-picture indication information comprises an index of the sub-picture; or the slice indication information comprises an index of the slice; or the tile indication information comprises an index of the tile; or the QoS parameter corresponding to the packet data unit set comprises at least a packet data unit set integrated handling indication (PSIHI);

or, wherein the packet data unit set indication information comprises one or more of the following:

an index of the packet data unit set;

information of a window corresponding to the packet data unit set;

a starting position and a duration of the packet data unit set;

a starting position and an ending position of the packet data unit set; or an absolute time at which the packet data unit set is to be sent.

10. A communication device, comprising: a memory, a transceiver, and a processor;

wherein the memory is configured to store a computer program; the transceiver is configured to transmit and receive data under the control of the processor; and the processor is configured to read the computer program in the memory and perform the following operations:

determining an association relationship between service data units (SDUs);

in case that at least one SDU among the multiple SDUs with the association relationship needs to be discarded or is not successfully transmitted, discarding one or more of the multiple SDUs with the association relationship or protocol data units (PDUs) corresponding to the multiple SDUs with the association relationship;

wherein the processor is configured to read the computer program in the memory and perform the following operations:

determining whether an SDU discard processing function is activated or deactivated according to configuration information;

in case that the SDU discard processing function is activated and the at least one SDU among the multiple SDUs with the association relationship needs to be discarded or is not successfully transmitted, discarding one or more of the multiple SDUs with the association relationship or PDUs corresponding to the multiple SDUs with the association relationship.

11. The communication device according to claim 10, wherein the determining the association relationship between the SDUs comprises: determining, by a target air-interface protocol layer, the association relationship between the SDUs, the target air-interface protocol layer comprises one of the following:

a PDCP layer;

an RLC layer;

an MAC layer.

12. The communication device according to claim 10, wherein the determining the association relationship between the SDUs comprises: determining the association relationship between the SDUs according to first indication information, the first indication information comprises one or more of the following:

frame indication information;

sub-picture indication information;

slice indication information;

tile indication information;

packet data unit set indication information; or a QoS parameter corresponding to a packet data unit set.

13. The communication device according to claim 12, wherein the processor is configured to read the computer program in the memory and perform the following operations:

obtaining the first indication information;

wherein the first indication information is carried in one of the following information:

an SDU header;

an SDU payload;

inter-layer interaction information sent by an upper layer to an access stratum.

14. The communication device according to claim 10, wherein the configuration information is configured for one of the following:

a bearer;

a logical channel;

a packet data unit set.

15. The communication device according to claim 11, wherein the processor is configured to read the computer program in the memory and perform one of the following operations:

in case that a timer corresponding to any one of the multiple SDUs with the association relationship expires, discarding one or more of the multiple SDUs with the association relationship or PDUs corresponding to the multiple SDUs with the association relationship; wherein one timer is maintained for each of the multiple SDUs with the association relationship;

in case that a timer corresponding to any one of the multiple SDUs with the association relationship expires, discarding one or more of the multiple SDUs with the association relationship or PDUs corresponding to the multiple SDUs with the association relationship, and deleting or stopping a timer corresponding to each of the multiple SDUs with the association relationship; wherein one timer is maintained for each of the multiple SDUs with the association relationship;

in case that a timer corresponding to the multiple SDUs with the association relationship expires, discarding one or more of the multiple SDUs with the association relationship or PDUs corresponding to the multiple SDUs with the association relationship, wherein one timer is maintained for the multiple SDUs with the association relationship;

in case that it is determined, according to congestion indication information sent by a lower layer of the target air-interface protocol layer, that at least one SDU among the multiple SDUs with the association relationship needs to be discarded, discarding the multiple SDUs with the association relationship;

in case that it is determined, according to indication information sent by a lower layer of the target air-interface protocol layer, that a PDU corresponding to at least one SDU among the multiple SDUs with the association relationship is lost, deleting one or more of the multiple SDUs with the association relationship or PDUs corresponding to the multiple SDUs with the association relationship at the target air-interface protocol layer;

for protocol layer entity reestablishment in the target air-interface protocol layer, for a data radio bearer (DRB) in an un-acknowledged mode, in case that the protocol layer entity is a receiving entity, SDUs stored in the protocol layer entity comprise multiple SDUs with the association relationship, and at least one SDU of the multiple SDUs with the association relationship is not successfully received, discarding the multiple SDUs with the association relationship and not delivering the multiple SDUs with the association relationship to an upper layer of the target air-interface protocol layer;

for protocol layer entity release in the target air-interface protocol layer, for one or more of the DRB in the un-acknowledged mode or the DRB in an acknowledged mode, in case that SDUs stored in the protocol layer entity comprise multiple SDUs with the association relationship, and at least one SDU of the multiple SDUs with the association relationship is not successfully received, discarding the multiple SDUs with the association relationship and not delivering the multiple SDUs with the association relationship to the upper layer of the target air-interface protocol layer;

in case that the multiple SDUs with the association relationship belong to one packet data unit set, and one or more SDUs among the multiple SDUs with the association relationship have not been successfully sent when an absolute time at which the packet data unit set is to be sent is reached, discarding one or more of the multiple SDUs with the association relationship or PDUs corresponding to the multiple SDUs with the association relationship.

16. The communication device according to claim 15, wherein the processor is configured to read the computer program in the memory and perform the following operations:

in case that one timer is maintained for the multiple SDUs with the association relationship, upon a first SDU among the multiple SDUs with the association relationship being received, starting the timer.

17. The communication device according to claim 11, wherein the multiple SDUs with the association relationship each belong to a different protocol layer entity of the target air-interface protocol layer;

or, at least some of the multiple SDUs with the association relationship belong to a same protocol layer entity of the target air-interface protocol layer;

wherein in case that the multiple SDUs with the association relationship each belong to the different protocol layer entity of the target air-interface protocol layer, second indication information is exchanged between the different protocol layer entities;

wherein the second indication information comprises one or more of the following:

frame indication information about a frame that needs to be discarded;

slice indication information about a slice that needs to be discarded;

tile indication information about a tile that needs to be discarded;

sub-picture indication information about a sub-picture that needs to be discarded;

packet data unit set indication information about a packet data unit set that needs to be discarded; or indication information of an SDU in a packet data unit set that needs to be discarded.

18. The communication device according to claim 12, wherein the frame indication information comprises one or more of the following:

frame type indication information; or frame index indication information;

or, wherein the sub-picture indication information comprises an index of the sub-picture; or the slice indication information comprises an index of the slice; or the tile indication information comprises an index of the tile; or the QoS parameter corresponding to the packet data unit set comprises at least a packet data unit set integrated handling indication (PSIHI);

or, wherein the packet data unit set indication information comprises one or more of the following:

an index of the packet data unit set;

information of a window corresponding to the packet data unit set;

a starting position and a duration of the packet data unit set;

a starting position and an ending position of the packet data unit set; or an absolute time at which the packet data unit set is to be sent.

* * * * *